United States Patent Office 2,969,940
Patented Jan. 31, 1961

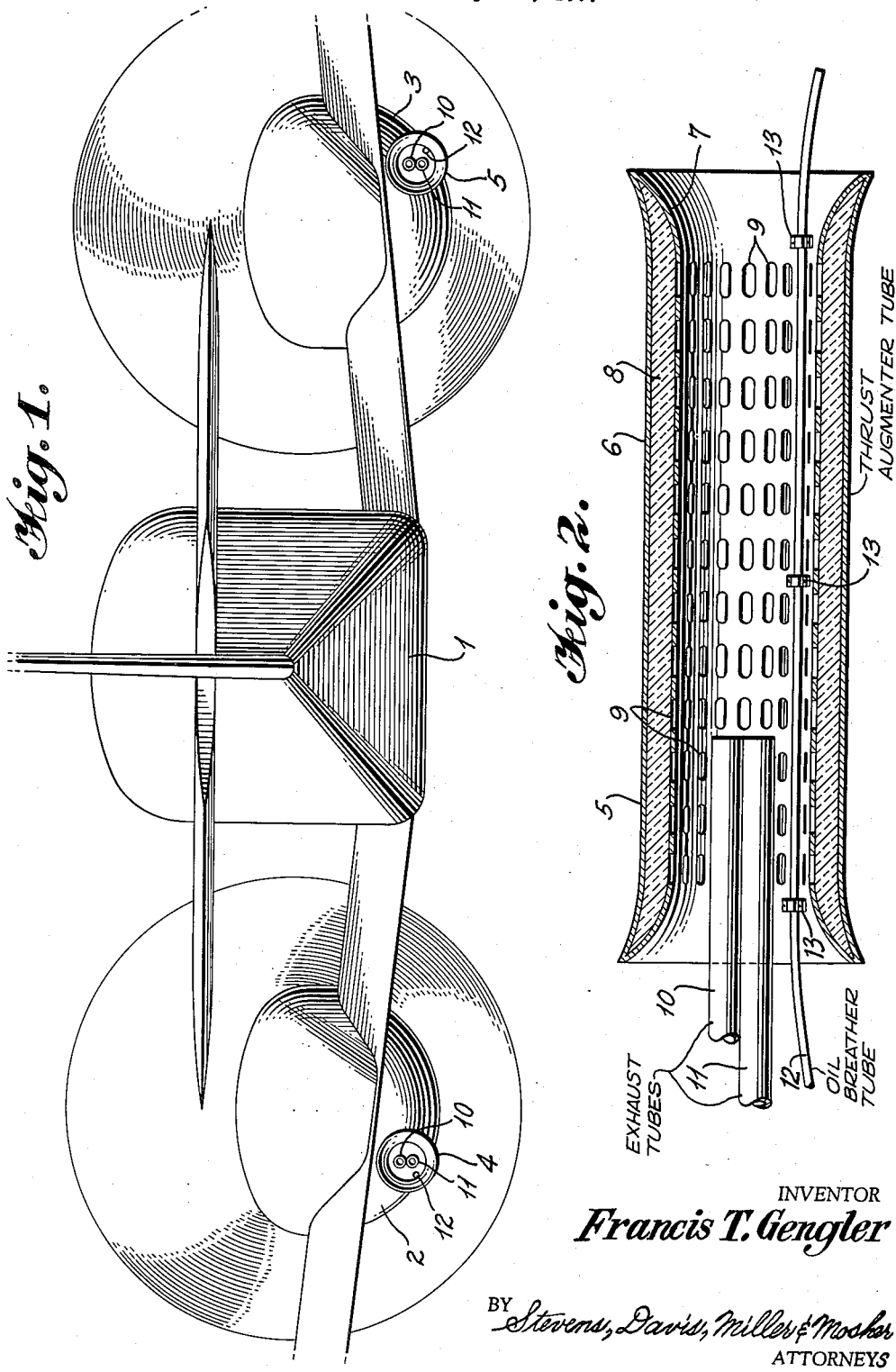

2,969,940

AIRCRAFT EXHAUST THRUST AUGMENTER WITH AN OIL BREATHER TUBE

Francis T. Gengler, 132 E. 2nd St., Mount Carmel, Pa.

Filed Sept. 9, 1959, Ser. No. 838,864

3 Claims. (Cl. 244—53)

In accordance with the present invention the oil breather tube, instead of extending from the oil trap (crankcase) to a position adjacent the trailing edge of the wing near the wheel-well, extends through the thrust augmenter tube so as to project outwardly beyond the after end of the thrust augmenter tube.

The purpose of the above described arrangement is twofold: first of all, the heat in the thrust augmenter tube will keep the oil breather tube sufficiently heated, even at high altitudes, to prevent the freezing of condensation in the oil breather tube which might otherwise block or restrict the passage in the oil breather tube so as to present serious difficulties as far as the operation of the engine is concerned; secondly, the oil breather tube of the present invention permits free and easy passage of oil, in the form of droplets, fog or mist, through the breather tube to a discharge point beyond the trailing edge of the wing so as to prevent the airplane from getting dirty, and, at the same time, in a manner which prevents carbonization of the oil.

Therefore, it is a principal object of the present invention to provide an oil breather tube which extends into, through and beyond the thrust augmenter tube so as to keep the breather tube sufficiently heated to prevent the freezing of condensation in the oil breather tube.

It is a further object of the present invention to provide an oil breather of the type referred to above whereing the oil which enters the breather tube is permitted to pass freely and easily through the tube and to be discharged at a point adjacent or beyond the trailing edge of the wing so as to prevent the deposition of oil and/or dirt on the airplane.

Other and further objects of the present invention will hereinafter more fully appear in connection with the detailed description of the drawings wherein:

Figure 1 is a rear view of a two-engine airplane wherein each of the engines has a thrust augmenter tube and an oil breather tube passing through each of the thrust augmenter tubes; and Figure 2 is a longitudinal cross-sectional view through one of the thrust augmenter tubes, showing the relative arrangement between the oil breather tube and the thrust augmenter tube.

Referring to the drawings in detail, Figure 1 shows an airplane 1 having engines 2 and 3 and thrust augmenter tubes 4 and 5 associated with the two engines, respectively. Referring to Figure 2, the thrust augmenter tube 5 has an outer shell 6 and an inner shell 7 separated by a layer 8 of fiber glass, or other similar material which fills the space between the inner and outer shells. The inner shell 7 is preferably provided with a plurality of perforations 9. The forward (left-hand end) of the thrust augmenter tube is wide open and two exhaust manifold outlets 10 and 11 extended about for or five inches into the forward end of the thrust augmenter tube. These exhaust manifolds are about an inch and a half, or two inches in diameter and are arranged one above the other, substantially in vertical alignment. The after end of the thrust augmenter tube is also open to the air at the trailing edge of the wing and both ends of the thrust augmenter tube are flared slightly. Thus, the exhaust gases of the airplane engine discharging from the exhaust tubes 10 and 11 pass through the associated thrust augmenter tube. The thrust augmenter tube, as described above, and its relation to the exhaust tubes and the engines, is essentially conventional.

In addition to the above described conventional arrangement of the thrust augmenter tube, the present invention includes an oil breather tube 12 which is attached to the crankcase or oil trap of the engine in the same conventional manner (not shown) as the normal oil breather tube. The oil breather tube 12 of the present invention is arranged to enter the forward end of the thrust augmenter 5 passing rearwardly through and extending rearwardly and preferably slightly downwardly beyond the after end of the thrust augmenter tube. The oil breather tube 12 may be conveniently attached to the inner shell 7 of the thrust augmenter tube by means of brackets or clips 13.

Preferably, each oil breather tube 12 will be located (within its thrust augmenter tube) outboard in relation to its respective engine. Thus, as shown in Figure 1, the oil breather tube 12 is in about the 7 o'clock position with respect to the thrust augmenter tube 4 and in about the 5 o'clock position with respect to the thrust augmenter tube 5.

The present invention is applicable to any airplane utilizing, or capable of utilizing, thrust augmenter tubes. If the heat inside the thrust augmenter tube is found to be too great, the oil breather tube may be covered, in whole or in part, with asbestos or fiber glass or other heat insulating material so as to prevent overheating and resulting carbonization of the oil in the breather tube.

Whereas the present invention has been described in particular relation to the drawings attached hereto, it should be understood that other and further modifications, apart from those shown or suggested herein, may be made within the spirit and scope of this invention.

What is claimed is:

1. In combination with a thrust augmenter tube for an airplane engine, said thrust augmenter tube communicating at its forward end with the exhaust of said engine and terminating at its after end adjacent the trailing edge of the airplane wing, an oil breather tube communicating with the crank case of said engine and extending into the interior of the thrust augmenter tube at the forward end thereof, passing along the lengh of the thrust augmenter tube and terminating at a point adjacent the after end of said thrust augmenter tube.

2. In an airplane engine of the type having a thrust augmenter tube through which the exhaust gases of said engine pass and an oil breather tube communicating with the crank case of said engine, the improvement wherein said oil breather tube is extended to enter the forward end of said tube, to pass along the interior of said thrust augmenter tube for substantially the entire length thereof and to terminate at a point adjacent the after end of said thrust augmenter tube.

3. In a multi-engine aircraft of the type wherein each engine is provided with a thrust augmenter tube connected at is forward end to the exhaust of said engine and terminating at its after end adjacent the trailing edge of the wing of said aircraft, and wherein each engine is provided with an oil breather tube communicating with the crank case of said engine, the improvement wherein each oil breather tube is extended to enter the forward end of its corresponding thrust augmenter tube, to pass along the interior of said thrust augmenter tube for the entire length thereof and to terminate at a position slightly beyond the after end of said thrust augmenter tube, each oil breather tube being located outboard in relation to the center of its corresponding thrust augmenter tube.

References Cited in the file of this patent
UNITED STATES PATENTS

| | | |
|---|---|---|
| 644,027 | Baines | Feb. 20, 1900 |
| 2,203,554 | Uhri | June 4, 1940 |
| 2,390,161 | Mercier | Dec. 4, 1945 |